US012148971B2

(12) United States Patent
Gäbler

(10) Patent No.: US 12,148,971 B2
(45) Date of Patent: Nov. 19, 2024

(54) RADIO FREQUENCY DEVICE

(71) Applicant: BEIJING BOE SENSOR TECHNOLOGY CO., LTD., Beijing (CN)

(72) Inventor: Alexander Gäbler, Darmstadt (DE)

(73) Assignee: BEIJING BOE SENSOR TECHNOLOGY CO., LTD., Beijing (CN)

( * ) Notice: Subject to any disclaimer, the term of this patent is extended or adjusted under 35 U.S.C. 154(b) by 313 days.

(21) Appl. No.: 17/761,120

(22) PCT Filed: Sep. 17, 2020

(86) PCT No.: PCT/EP2020/075941
§ 371 (c)(1),
(2) Date: Mar. 16, 2022

(87) PCT Pub. No.: WO2021/053056
PCT Pub. Date: Mar. 25, 2021

(65) Prior Publication Data

US 2022/0407208 A1 Dec. 22, 2022

(30) Foreign Application Priority Data

Sep. 18, 2019 (EP) .................................... 19198156

(51) Int. Cl.
*H01P 5/107* (2006.01)
*H01P 3/08* (2006.01)
*H01P 3/12* (2006.01)

(52) U.S. Cl.
CPC .............. *H01P 5/107* (2013.01); *H01P 3/081* (2013.01); *H01P 3/12* (2013.01)

(58) Field of Classification Search
CPC .... H01P 5/107; H01P 3/08; H01P 5/08; H01P 5/10; H01P 3/12; H01P 5/024; H01P 5/12;
(Continued)

(56) References Cited

U.S. PATENT DOCUMENTS 6,160,454 A * 12/2000 Buer .......................... H01P 5/12 330/307
9,843,084 B2 * 12/2017 Sherrer .................. H01P 5/183
2017/0222323 A1 8/2017 Brown

FOREIGN PATENT DOCUMENTS

CN 109818124 A 5/2019
GB 1059547 A 2/1967
JP S6216603 A 1/1987

OTHER PUBLICATIONS

Gäbler, Copending U.S. Appl. No. 17/761,132; national phase entry of PCT/EP2020/076124.
(Continued)

*Primary Examiner* — Lincoln D Donovan
*Assistant Examiner* — Tyler J Pereny
(74) *Attorney, Agent, or Firm* — Dilworth & Barrese, LLP.; Michael J. Musella, Esq.

(57) ABSTRACT

A transition unit providing a radio frequency signal transition between a radio frequency hollow waveguide system and a planar transmission line comprises two or more transition sections of transmission line arranged adjacent to each other at a first surface of the first substrate layer of a substrate layer arrangement. The hollow waveguide system comprises a distribution section. One input waveguide is separated into one dedicated output waveguide for each of the transition sections. For each of the transition sections of the transmission lines a corresponding end section of a respective output waveguide is directed perpendicular to the first surface of the first substrate layer. For each end section
(Continued)

an open end of the end section of the waveguide system superposes the corresponding transition section. The two or more end sections are arranged adjacent to each other in order to provide for favorable boundary conditions for electromagnetic wave propagation.

19 Claims, 6 Drawing Sheets

(58) Field of Classification Search
CPC . H01P 1/184; H01P 3/081; G02B 2006/1215; G02B 6/1228; G02B 6/125; G02B 6/126; H01L 2223/6616; H01L 2223/6627; H01L 2223/6633; H01L 2223/6677; H01L 23/49827
See application file for complete search history.

(56) References Cited

OTHER PUBLICATIONS

Novel Near-Field Millimeter-Wave Differential Probe Using a Loaded Modulated Aperture, Authors: Abou-Khousa M A, Kharkovsky S, Zoughi R, Publication data: IEEE Transactions on Instrumentation and Measurement,,May 1, 2009, IEEE, USA, Source info: vol. 58, Nr: 5, pp. 1273-1282.
Ortner, Markus, Ziqiang Tong, and Timm Ostermann. "A millimeter-wave wide-band transition from a differential microstrip to a rectangular waveguide for 60 GHz applications." In Proceedings of the 5th European Conference on Antennas and Propagation (EUCAP), pp. 1946-1949. IEEE, 2011.

* cited by examiner

RADIO FREQUENCY DEVICE

TECHNICAL FIELD

The disclosure relates to a radio frequency device with a transition unit providing a radio frequency signal transition between a radio frequency hollow waveguide system and a planar transmission line.

BACKGROUND

Several applications for electromagnetic waves and corresponding signals require low loss transmission or low loss distribution of radio frequency signals, and many applications require both. Hollow waveguides like e.g. rectangular waveguides that are made from an electroconductive material are commonly used in this regard. However, further signal processing usually requires a transition to a planar substrate where, depending on the purpose, several kinds of planar transmission lines are commonly used. The coupling of radio frequency waves between hollow waveguides and planar transmission lines depends on the kind of planar transmission line that is used for signal transmission along a planar substrate layer. Different kinds of planar transmission lines include e.g. a microstrip transmission line or a differential pair transmission line. Nevertheless, the majority of published work focuses to the radio frequency signal transition from a hollow waveguide into the microstrip mode.

Several possibilities of transitions between hollow waveguides and planar transmission lines are known from literature, but they are affected by detrimental characteristics and constraints. Usually, such transitions suffer from bandwidth limitations. In many cases the already known transitions require vias within the substrate layer which are not only costly but also not easily applicable to all used substrate technologies e.g. multilayer glass. They are also comparably bulky which limits the application to either one single transition or multiple transitions which are geometrically well separated. Furthermore, such transitions usually require the insertion of the substrate into the waveguide itself which limits the placement of the transition to edge or corner points of the substrate.

However, for many applications more tightly spaced transition points are required without the limitation to substrate edges and without the need of radiation suppressing vias over a larger bandwidth. Thus, there is a need to provide for a transition unit that allows for a highly efficient transition of the radio frequency signal, and that is easily manufactured and does not require much space.

SUMMARY

The disclosure relates to a radio frequency device with a transition unit providing a radio frequency signal transition between a radio frequency hollow waveguide system and a planar transmission line. The radio frequency device comprising a substrate layer arrangement with the planar transmission line arranged on a first surface of a substrate layer of the substrate layer arrangement, whereby the transition unit comprises a transition section of the transmission line that is configured as a radio frequency signal transition pattern, and whereby the transition unit further comprises an end section of the waveguide system for radio frequency electromagnetic waves that is attached to the substrate layer arrangement and that superposes the radio frequency signal transition pattern.

The transition unit comprises two or more transition sections of a corresponding number of transmission lines that are arranged adjacent to each other, whereby the hollow waveguide system comprises a distribution section wherein one input waveguide is separated into one dedicated output waveguide for each of the transition sections, that for each of the transition sections of the transmission lines a corresponding end section of a respective output waveguide is directed perpendicular to the first surface of the substrate layer arrangement, whereby for each end section an open end of the end section of the waveguide system superposes the corresponding transition section, and whereby the two or more end sections of the waveguide system are arranged adjacent to each other in order to provide for favorable boundary conditions for electromagnetic wave propagation that result in reduced radio frequency signal power leakage from the transition unit when compared to a transition unit with only one end section of the waveguide system.

It is known in prior art to split-up a single input waveguide into two or more separate output waveguides in such a manner that the separation of the output waveguides and the corresponding distribution of the incoming radio frequency signal transmission into two or more output waveguides does not result in a significant signal leakage, i.e. in a significant decrease of the total radio frequency signal power that is transmitted along the separate output waveguides. Thus, it is possible to make use of such a separation of a single input waveguide into two or more separate output waveguides within the transition unit of a radio frequency device in order to reduce the radio frequency signal leakage within the transition unit. Two or more end sections of the waveguide system can be arranged adjacent to each other in such a manner that a first end section of a first output waveguide provides for a favorable additional boundary condition with respect to the radio frequency signal transition from a second end section of a second output waveguide into the corresponding transition section of the respective transmission line that is positioned next to the first output waveguide. The first end section of the first output waveguide comprises wall sections that are made from an electroconductive material. By appropriately designing and arranging the first end section of the first output waveguide the wall sections of the first end section can be used in order to reduce the undesired signal power leakage during signal transition within the transition unit. It is not necessary to provide for additional wall sections made from an electroconductive material that are not part of end sections of output waveguides of the waveguide system. A person skilled in the art is aware of several considerations and methods and is thus able to deliberately predefine the design and arrangement of the several end sections of the output waveguides in order to provide for advantageous boundary conditions for the several end sections of the output waveguides that reduce unwanted power leakage during signal transition within the transition unit.

The benefits of this invention can be used for radio frequency devices that comprise several separate transmission lines on a substrate layer. Thus, the invention is considered very advantageous for radio frequency devices with a large number of transmission lines along a surface of a substrate layer, like e.g. a phased array antenna. However, it is also possible to make use of the benefits of a transition unit according to the present invention in case that only a single transmission line or a single radio frequency signal transmission along a surface of the substrate layer is required. In such a case the transition unit separates the radio frequency signal input into several output waveguides, provides for an advantageous transition of the separate radio frequency signal transmissions into a number of transmission lines along the surface of the substrate layer, and subsequently combines the several transmission lines into a single transmission line.

The transition section of a transmission line may comprise a radio frequency signal transition pattern that is optimized for emission and reception of the radio frequency signal that is transmitted along the transmission line. According to an embodiment of this invention the transition pattern may comprise dipole shaped end sections that run parallel and backwards to the direction of the transmission line.

The hollow waveguide system may comprise an arbitrary number of waveguide splitting units that each split-up one input waveguide into at least two output waveguides, whereby the phases and the amplitude distribution of the at least two output waveguides are known and preset by the design of the hollow waveguide system and the waveguide splitting units. For example, a waveguide splitting unit may split-up one input waveguide into a main output waveguide that continues in the same direction as the input waveguide, and into two sub-branch output waveguides that run perpendicular to the direction of the input waveguide. As long as the phase shift between the incoming radio frequency signal and the outgoing radio frequency signals are known, such a hollow waveguide system can be used for creating a preset number of output waveguides from a single input waveguide, whereby the phase and amplitude of each of the output waveguides is known and can be used for transitions into a corresponding number of planar transmission lines.

According to an advantageous aspect, the hollow waveguide system comprises N output waveguides and N−1 corresponding waveguide splitting units that each split-up one input waveguide into two output waveguides, with N being an even integer number. An even number of N output waveguides with N an even integer allows for a symmetric arrangement of the hollow waveguide system with the N output waveguides, which facilitates an arrangement of the N output waveguides in a manner that reduces the undesired power leakage of the radio frequency signal within the transition unit. A waveguide splitting unit separates the input waveguide into two or more output waveguides, whereby the separation preferably does not result in a significant power loss or leakage of electromagnetic wave emission within the waveguide splitting unit. It is known in the art that waveguide splitting units that split-up one input waveguide into two output waveguides provide for advantageous characteristics and a small power loss during signal transmission through the waveguide splitting unit. Furthermore, such waveguide splitting units can be manufactured in a cost-effective manner and do not required much space. Thus, in order to provide for a number N of output waveguides, it is considered favorable to make use of a corresponding number N−1 of waveguide splitting units as described above.

According to yet another aspect, the hollow waveguide system comprises $2^N$ output waveguides, with N being an integer number and with N>1. For most applications it will be advantageous to arrange $2^N-1$ waveguide splitting units in N levels, whereby in a first level only one waveguide splitting unit is arranged that divides one input waveguide into two output waveguides which are the two input waveguides for a next level. At the next level, two waveguide splitting units divide each of the two output waveguides into a total of four output waveguides. In case that N is larger than 2, there is another following level and the four output waveguides of the previous level are the four input waveguides for the following level. For each of the N levels, a total of $2^{(N-1)}$ waveguide splitting units is arranged in the corresponding level, and at each of the N levels the number of output waveguides is doubled. This allows for a very compact and symmetric design of the hollow waveguide system as well as for a very compact and symmetric arrangement of the end sections of the output waveguides from the last level, whereby each end section of the output waveguides superposes the transition section of the corresponding transmission line.

According to an embodiment the end sections of the output waveguides that are attached to the substrate layer arrangement are symmetric in shape. A shape of the cross-section of the end sections can be circular, rectangular or quadratic. It is possible to arrange for all end sections having an identical shape, which provides for favorable boundary conditions for the signal transition into the planar transmission lines. It is also possible to arrange for some or all end sections having a differing shape that is different from at least one other end section. A symmetric shape of the end sections of the output waveguides allows for and supports the formation of dominant modes of signal propagation within the output waveguide that allow for a very effective transition of the radio frequency signal between the output waveguide and the corresponding transmission line. Furthermore, a symmetric shape of the end section of the output waveguides facilitates a symmetric design and arrangement of all end sections of the output waveguides which allows for advantageous boundary conditions that reduce unwanted leakage of radio frequency signal power during the transition.

In yet another advantageous embodiment the end sections of the output waveguides that are attached to the substrate layer are of rectangular shape. By adapting the dimensions of length and width of the cross-section of the end section of the output waveguides to the wavelength of the radio frequency signal that is to be transmitted along the hollow waveguide system, it is possible to enhance the formation of favorable modes of signal propagation, and in many cases to enhance a first order dominant mode of signal propagation.

In order to facilitate favorable boundary conditions for many end sections of the output waveguides as well as to allow for a very compact and space-saving arrangement of the end sections of the hollow waveguide system it is considered advantageous that several or all end sections of the output waveguides that are attached to the substrate layer are arranged along a straight line. A distance between two adjacent end sections within such a row of end sections can be preset to support favorable boundary conditions. It is considered advantageous to provide for a distance within the range of at least $\lambda/4$ up to $3\lambda/4$ with $\lambda$ being the wavelength of the radio frequency signal. In many cases the design and arrangement of the end sections of the output waveguides of the hollow waveguide system can be a tradeoff between a space requirement for the transition unit and the desired reduction of the unwanted signal power leakage during transition of the radio frequency signal within the transition unit.

According to a beneficial embodiment, the end sections of the output waveguides that are attached to the substrate layer arrangement are arranged in two or more rows running parallel and at a distance towards each other. Two adjacent rows of end sections can have a longitudinal set-off along the direction of the rows such that when viewed perpendicular to the direction of the rows, the end sections within a first row are at a lateral set-off with respect to the end sections within a second row next to the first row. This allows for a very compact and space-saving arrangement of the end sections and the corresponding transmission lines that run into the transition sections that are superposed by the end sections. Furthermore, the end sections of a first row can be arranged with respect to a second and adjacent row in a manner that supports favorable boundary conditions for both rows.

According to a very advantageous aspect, the transition unit comprises for each end of a row one waveguide section element arranged adjacent to the last output waveguide within the row. The waveguide section element is designed and intended for providing for additional and favorable boundary conditions that result in a further reduction of the unwanted leakage of signal power during transition of the radio frequency signal. The waveguide section element is preferably made from an electroconductive material like e.g. metal. The waveguide section element can be e.g. a single plane or a planar surface of a hollow cavity that is arranged in parallel with the end section of the adjacent wall section of the end section of the last output waveguide within the row.

According to an embodiment, the waveguide section element is identical to the end section of the last output waveguide within the row. In case of an end section with a rectangular cross-section, the adjacent waveguide section element can have an identical cross-section and a length perpendicular to the first surface of the substrate layer arrangement that is large enough to provide for favorable boundary conditions, e.g. a length of at least half of the wavelength or a length at least equal to wavelength of the radio frequency signal for which the radio frequency device is designed for and presumably used. In many cases, manufacture of an additional end section at the end of a row of end sections is easily possible. Arranging an additional end section or a waveguide section element of similar shape at the end of the row of end sections provides for identical or at least very similar boundary conditions for all of the end sections of the output waveguides that are arranged within this row.

According to yet another aspect, at least two adjacent transmission lines each comprise a transmission section that runs into the transition section, whereby the transition section is superposed by the end section of the corresponding output waveguide and whereby the transmission section is arranged outside of a surface area on the first surface but parallel to a border of the surface area that is superposed by this end section of the corresponding output waveguide. By arranging solely the transition section of the transmission line within the superposed surface area of the corresponding end section of the output waveguide and by arranging a transmission section outside but parallel to the border of the superposed surface area, the transmission section can be used for further modifications of the radio frequency signal that is transmitted along the transmission section of the transmission line. Thus, the transmission section of the transmission line can be used e.g. as a phase shifting section of the transmission line, reducing the combined space requirement for the transition unit and the phase shifting sections of the corresponding transmission lines.

In order to further reduce any unwanted leakage of a radio frequency signal during transition, the transition unit comprises at least one or more back cavities, whereby each back cavity is arranged opposite to a corresponding end section of an output waveguide that is attached to the substrate layer arrangement with an open end of the back cavity directed towards the substrate layer arrangement, whereby the back cavity prevents a part of the radio frequency signal emission that is emitted from the emission pattern from leaking outside of the end section of the output waveguide.

By mounting the open end of the end section of the output waveguide on a surface of the substrate layer arrangement, the transition unit can be arranged at an arbitrary position within the surface of the first substrate layer that is comprised by the substrate layer arrangement. There is no need to arrange the transition unit at a border or edge of the substrate layer. Thus, the invention allows for more options and less space restrictions related to the design of the radio frequency device. A back cavity can be easily and cost-effectively manufactured. Many radio frequency devices require complex hollow waveguide structures arranged on one or both sides of the substrate layer arrangement, which facilitates the design and manufacture of additional back cavities. By adding a back cavity at the appropriate spot on the opposing surface of the substrate layer arrangement, the efficiency of the transition between the hollow waveguide system and the planar transmission line can be significantly enhanced, i.e. unwanted radio frequency signal emission leaking outside of the end section of the output waveguide can be reduced. Such a transition unit is considered advantageous over prior art especially with respect to radio frequency signal transitions from the planar transmission line into the adjacent hollow waveguide system.

According to an advantageous embodiment, a distance between the substrate layer arrangement and a back side of the back cavity that opposes the output waveguide at the substrate layer arrangement is larger than at least one distance between opposing parts of the circumferential line of a cross-section of the open end of back cavity. For many applications it is considered advantageous to provide for a large distance between a back side of the back cavity and the substrate layer arrangement with the planar transmission line, which helps to reduce the leakage of radio frequency signal emission from the transition unit. During design of the radio frequency device, there will usually be a trade-off between space requirements for the back cavity and enhancement of the signal transition efficiency.

According to a further aspect, a cross-section area of the open end of the back cavity and a cross-section area of the open end of the end section of the output waveguide are identical and the open end of the back cavity superposes the open end of the end section of the output waveguide. By matching the design and position of the end section of the output waveguide and the back cavity, the boundary conditions for the transition of the radio frequency signal can be modified and optimized in order to reduce unwanted leakage of the radio frequency signal emission from the transition unit, which will also enhance the transmission efficiency.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

DETAILED DESCRIPTION

Figure 1:
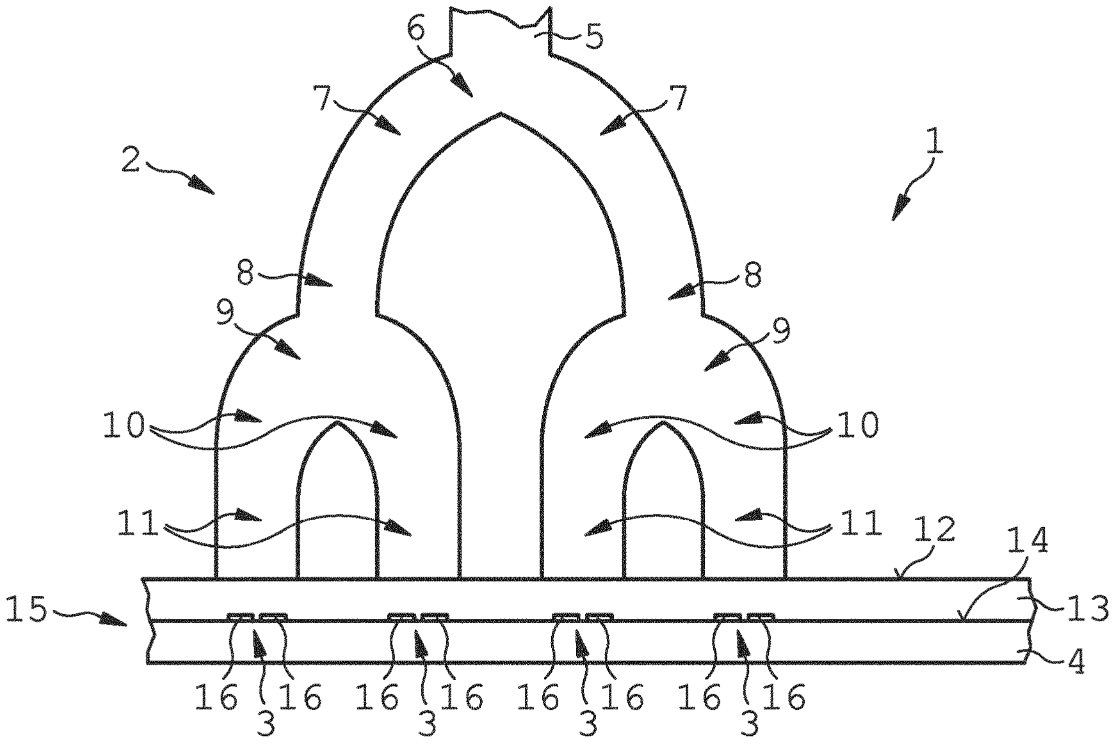
FIG. 1 illustrates a sectional view of a small region within a radio frequency device with a transition unit with four transition sections of transmission lines and corresponding end sections of a hollow waveguide system, the transition sections and the corresponding end sections each arranged in a row adjacent to each other.
Figure 2:
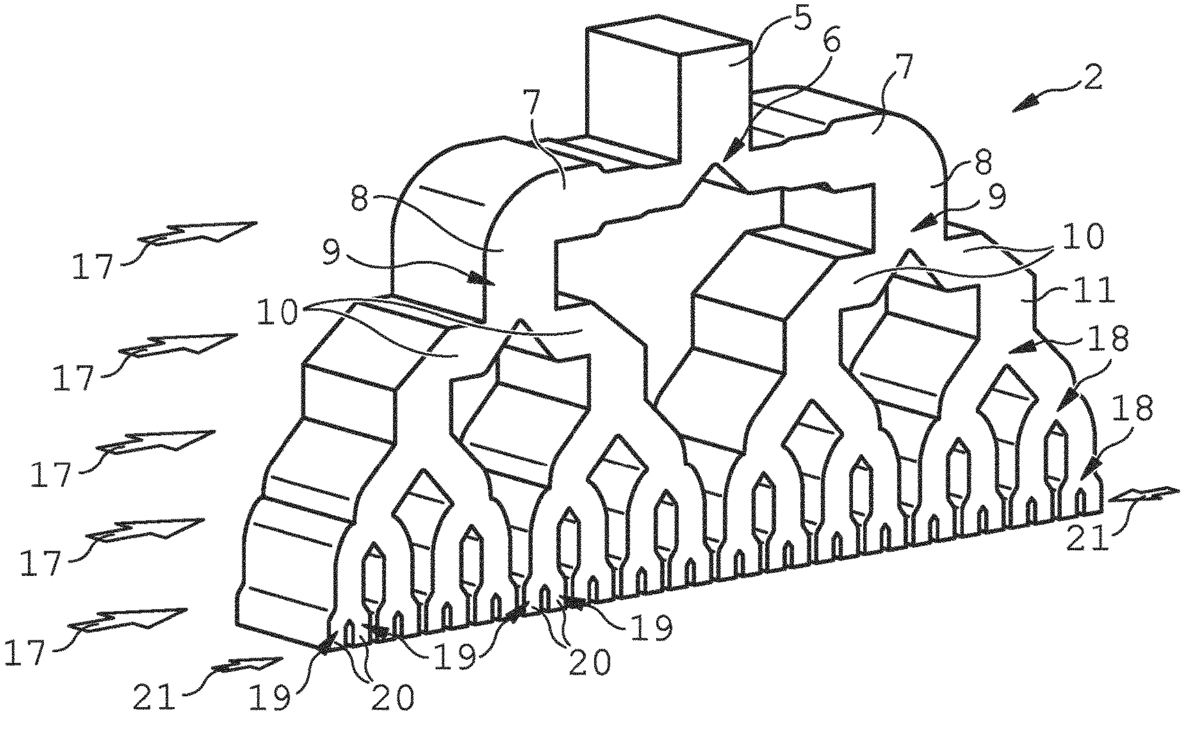
FIG. 2 illustrates a perspective view of a hollow waveguide system with one input waveguide and 32 output waveguides.
Figure 3:
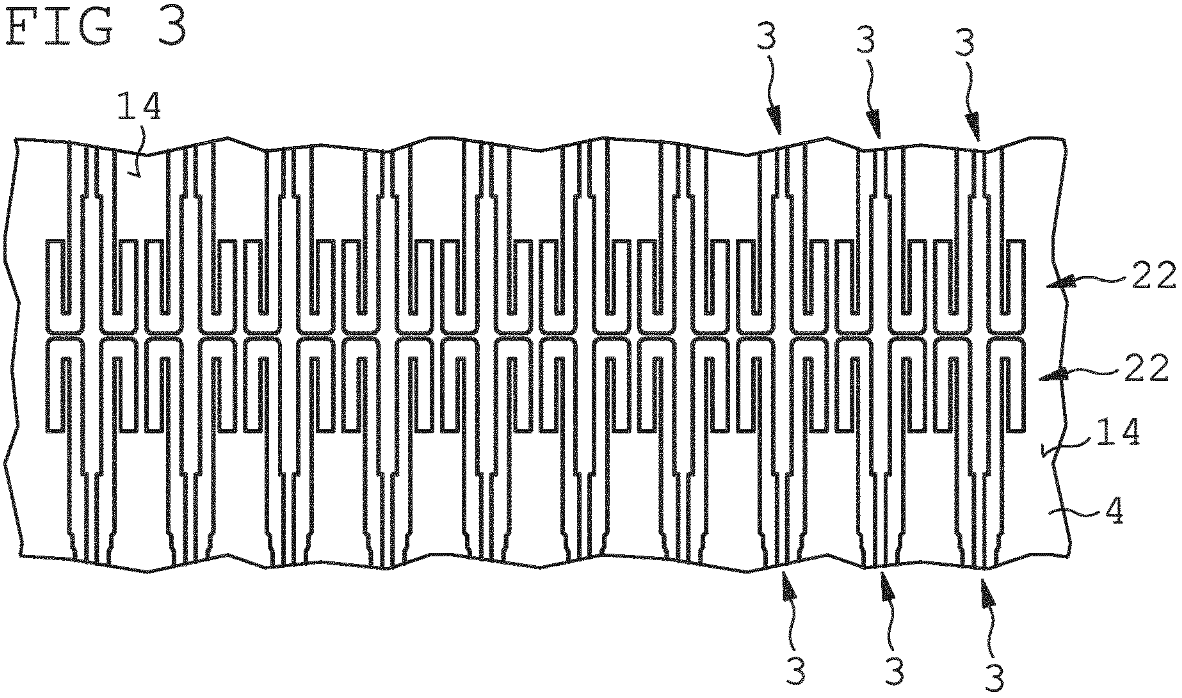
FIG. 3 illustrates a top view of a region of a substrate layer that is part of a substrate layer arrangement with a large number of transmission lines parallel to each other and with transition sections of the transmission lines arranged in a row adjacent to each other.

In FIG. 1 a sectional view of a schematic representation of a transition unit 1 is shown. Such a transition unit 1 can be incorporated into many different radio frequency devices and allows for a radio frequency signal transition between a hollow waveguide system 2 and a planar transmission line 3. An exemplary embodiment of such a hollow waveguide system 2 is shown in FIG. 2, and an exemplary embodiment of a first substrate layer 4 with a large number of transmission lines 3 arranged on a top side of the first substrate layer 4 is shown in FIG. 3.

The hollow waveguide system 2 is made from an electroconductive material, whereby the shape and dimensions of the hollow waveguide system 2 is adapted to allow for low-loss transmission of radio frequency signals along the waveguides within the waveguide system 2. The waveguide system 2 comprises an input waveguide 5 that is split-up within a waveguide splitting unit 6 into two separate output waveguides 7 that emerge from the waveguide splitting unit 6. Each of the two output waveguides 7 runs into a corresponding input waveguide 8 and a corresponding waveguide splitting unit 9. Each of the two waveguide splitting units 9 divides the input waveguide 8 into two emerging output waveguides 10, resulting in a total of four output waveguides 10 that are arranged in a row adjacent to each other. Thus, a radio frequency input signal that is feed into the input waveguide 5 will be split-up into four similar radio frequency output signals that are transmitted towards the four output waveguides 10.

Each of the output waveguides 10 runs into an open-ended end section 11 of the output waveguide 10. The end section 11 of each of the output waveguides 10 is mounted on a top side 12 of a second substrate layer 13. The second substrate layer 13 covers the first substrate layer 4 with the planar transmission lines 3 arranged on the top side 14 of the first substrate layer 4 and thus between the first and second substrate layer 4, 13. Within this exemplary embodiment a substrate layer arrangement 15 comprises these two substrate layers 4, 13. Each of the planar transmission lines 3 comprises two electroconductive transmission line sections 16 arranged parallel and at a distance towards each other.

Due to the symmetric shape and arrangement of the four output waveguides 10 any undesired leakage from the end sections 11 and possible cross-talk between adjacent output waveguides 10 is significantly reduced in comparison with a single output waveguide that is arranged in between other components of a radio frequency device, but at a large distance to a neighboring output waveguide. Thus, the efficiency of the transition of the radio frequency signal between the hollow waveguide system 2 and the corresponding transmission lines 3 is enhanced.

The exemplary embodiment of the hollow waveguide system 2 that is shown in FIG. 2 comprises five levels 17 of waveguide splitting units 6, 9, 18 with one waveguide splitting unit 6 in a first level 17, two waveguide splitting units 9 in a second level 16, and with $2^{n-1}$ waveguide splitting units 18 in a level n, with n an integer number between 2 and 5. At the end of the hollow waveguide system 2 a total of 32 output waveguides 19 run into a total of 32 end sections 20 of the output waveguides 19. The end sections 20 are arranged along a row 21 adjacent to each other. The part of the hollow waveguide system 2 between the first input waveguide 2 and the final output waveguides 19 can be labeled as distribution section, as the incoming radio frequency signal is distributed into a number of output waveguides 19. Preferably each of the waveguide splitting units 6, 9, 18 divides the corresponding incoming radio frequency signal into two outgoing radio frequency signals of similar intensity and signal characteristics.

It is easily understood by a person skilled in the art to modify the exemplary embodiment of the hollow waveguide system 2 to comprise additional levels up to a level N with N a positive integer number and further comprising $2^N-1$ waveguide splitting units 6, 9, 18. Thus, each level n with n an integer number between 0 and N comprises $2^{n-1}$ waveguide splitting units 6, 9, 18 resulting in $2^N$ output waveguides 19 with corresponding end sections 20 that can be mounted onto a substrate layer arrangement In FIG. 3 a top view towards the top surface 14 of the first substrate layer 4 of the substrate layer arrangement 15 shown in FIG. 1 is shown. A large number of transmission lines 3 is arranged on the top surface of the first substrate layer 4, whereby the transmission lines 3 are aligned in parallel and run into transition sections 22 with a radio frequency signal transition pattern, which is shown and described in more detail in FIGS. 7 and 8. The hollow waveguide system 2 can be mounted or arranged on top of the substrate layer arrangement 15 in a manner so that each of the end sections 20 of the output waveguides 19 of the hollow waveguide system 2 superposes a corresponding transition section 22 of the transmission lines 3.

Figure 4:
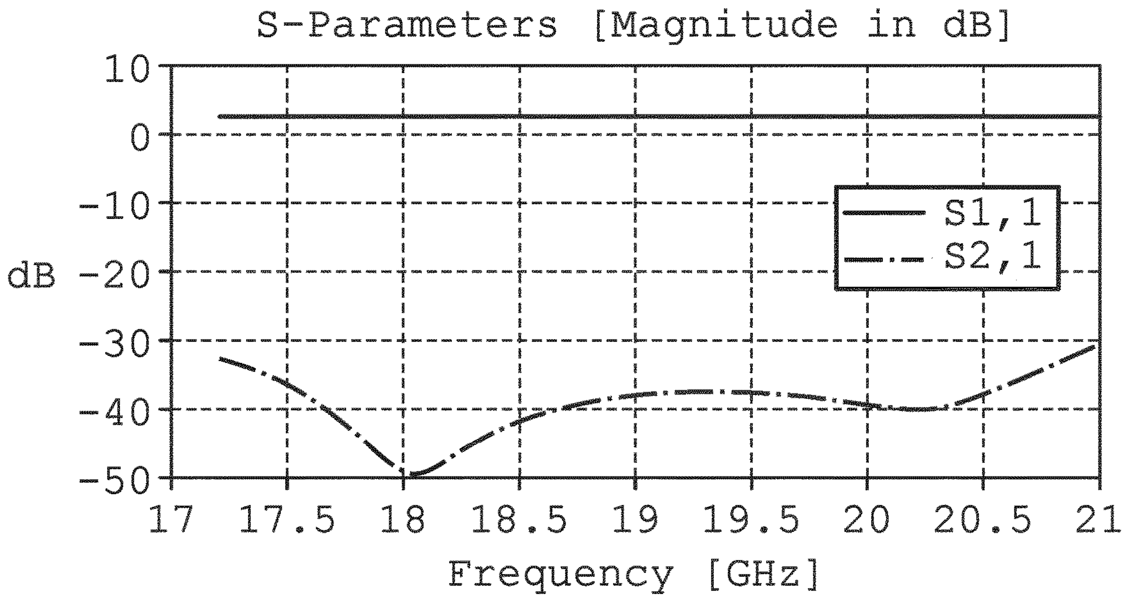
FIG. 4 illustrates the schematic representation of simulation results of the S-Parameter S11 and S21 that characterizes the transmission of a radio frequency signal from the hollow waveguide system to a transmission line.

In FIG. 4 a schematic diagram of the results of a simulation of two S-parameters S1,1 and S2,1 of a signal transition of a radio frequency signal between a single output waveguide 19 and the corresponding transition section 22 of a corresponding transmission line 3 within a frequency range between 17 and 21 GHz, whereby the output waveguide 19 and the transition section 22 are part of the transition unit 1. The magnitude in dB of the two S-parameters S1,1 and S2,1 is plotted along the ordinate, whereas the frequency range of the signal frequency is depicted along the abscissa of the diagram. It can be seen that the magnitude of the undesirable signal leakage that corresponds to the S-parameter S2,1 is very low over a large frequency range between 17.5 GHz and 20.5 GHz.

Figure 5:
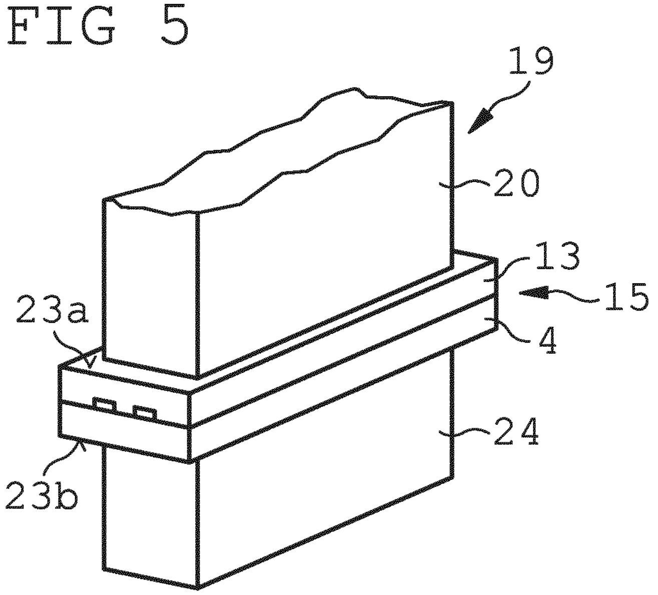
FIG. 5 illustrates a perspective view of an end section of an output waveguide that is arranged on top of a substrate layer arrangement with a transition section of a transmission line, whereby a back cavity is arranged at the substrate layer arrangement opposite to the end section of the output waveguide.

In FIG. 5 an end section 20 of a single output waveguide 19 is shown that is arranged on a top surface 23*a* of the substrate layer arrangement 15 of the first substrate layer 4 and the second substrate layer 13. At a bottom surface 23*b* of the substrate layer arrangement 15 and opposite to the output waveguide 19 a back cavity 24 is arranged such that a cross-section of an open end of the back cavity 24 superposes a cross-section of the end section 20 of the output waveguide 19. The back cavity 24 is a section of a waveguide similar to the single output waveguide 19 at the opposite side of the substrate layer arrangement. The back cavity 24 has an opening towards the substrate layer arrangement 15 and a closed back side opposite to the opening and the substrate layer arrangement 15. By adding a back cavity 24 for each of the end sections 20 of the output waveguides 19 an unwanted signal leakage during the signal transition between the hollow waveguide system 2 and the transmission lines 3 can be further reduced. A person skilled in the art has knowledge and is able to determine and adapt the shape and dimensions of the back cavity 24 to match the end section 20 of the output waveguide 19 and to reduce any unwanted signal leakage as much as possible.

Figure 6:
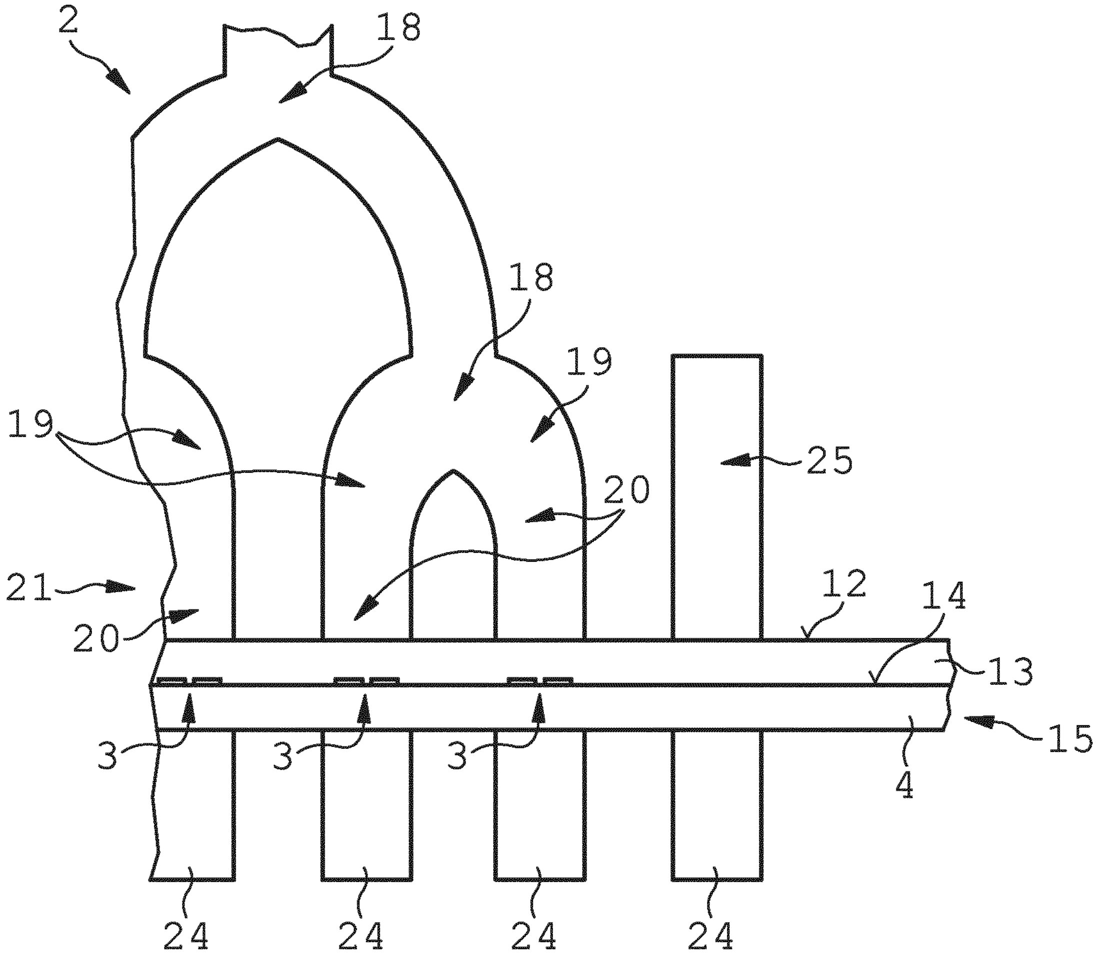
FIG. 6 illustrates a sectional view of an end region of the transition unit with a waveguide section element at the end of the row of end sections of the waveguide system.

In FIG. 6 and end region of the row 21 of end sections 20 of the output waveguides 19 of the hollow waveguide system 2 is shown, whereby the end sections 20 are mounted onto the substrate layer arrangement 15. For each end section 20 a corresponding back cavity 24 is arranged at the substrate layer arrangement 15 opposite to the respective end section 20. Next to the last end section 20 within the row 21 a waveguide section element 25 is mounted onto the substrate layer arrangement 15. The hollow waveguide section element 25 is made of an electroconductive material and matches the end sections 20 of the output waveguides 19 in shape and dimension. Furthermore, opposite to the waveguide section element 25 a corresponding back cavity 24 is arranged at the substrate layer arrangement 15. By adding a waveguide section element 25 that is not part of the hollow waveguide system 2 but adds to the row 21 of end sections 20 and establishes a symmetric counterpart of waveguide sections for the last end section 20 within the row 21, the unwanted leakage of radio frequency signal intensity during a signal transition is further reduced and the efficiency of the signal transition enhanced.

Figure 7:
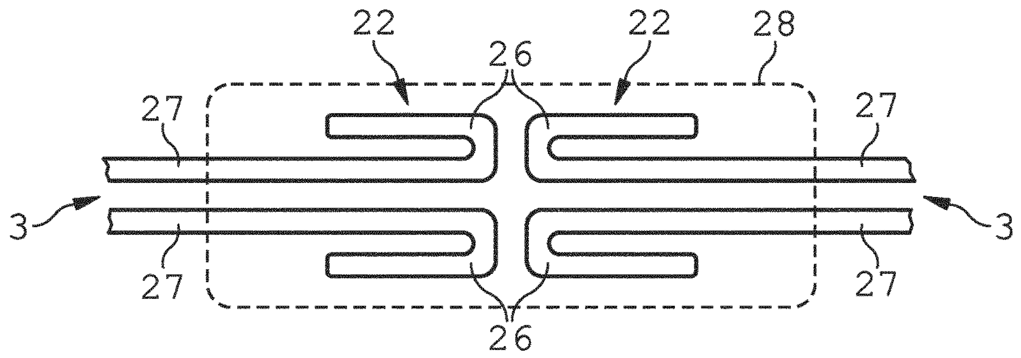
FIG. 7 illustrates a schematic view of the transition sections of two transmission lines that are aligned with each other, whereby the cross-section of the corresponding end section of the output waveguide that superposes the transition sections is represented by a dashed line.
Figure 8:
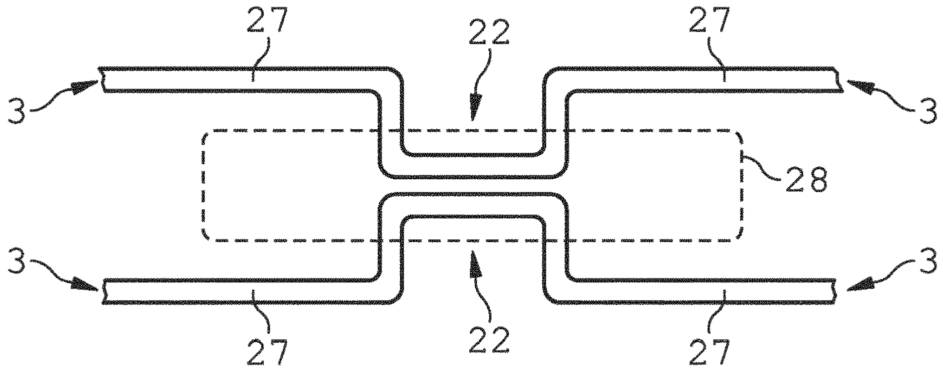
FIG. 8 illustrates a schematic view similar to FIG. 7 for a different embodiment of the transmission lines.

In FIGS. 7 and 8 two different exemplary embodiments of transition sections 22 of transmission lines 3 are shown.

The transition sections 22 shown in FIG. 7 comprise dipole shaped end sections 26 that runs parallel and backwards to the direction of the transmission line 3. Transmission sections 27 of the transmission line 3 are superposed by the cross-section 28 of the end section 20 of the corresponding output waveguide 19 that is depicted with a dashed line.

In another embodiment shown in FIG. 8, the corresponding transmission sections 27 of the transmission lines 3 run outside of the cross-section 28 of the end section 20 of the corresponding output waveguide 19 which allows for a more space saving design of the transition unit 1 within the radio frequency device, as the transmission sections 27 that are not superposed by the end sections 20 of the output waveguides 19 can be used for additional manipulation of the radio frequency signal that is transmitted along the transmission lines 3.

Figure 9:
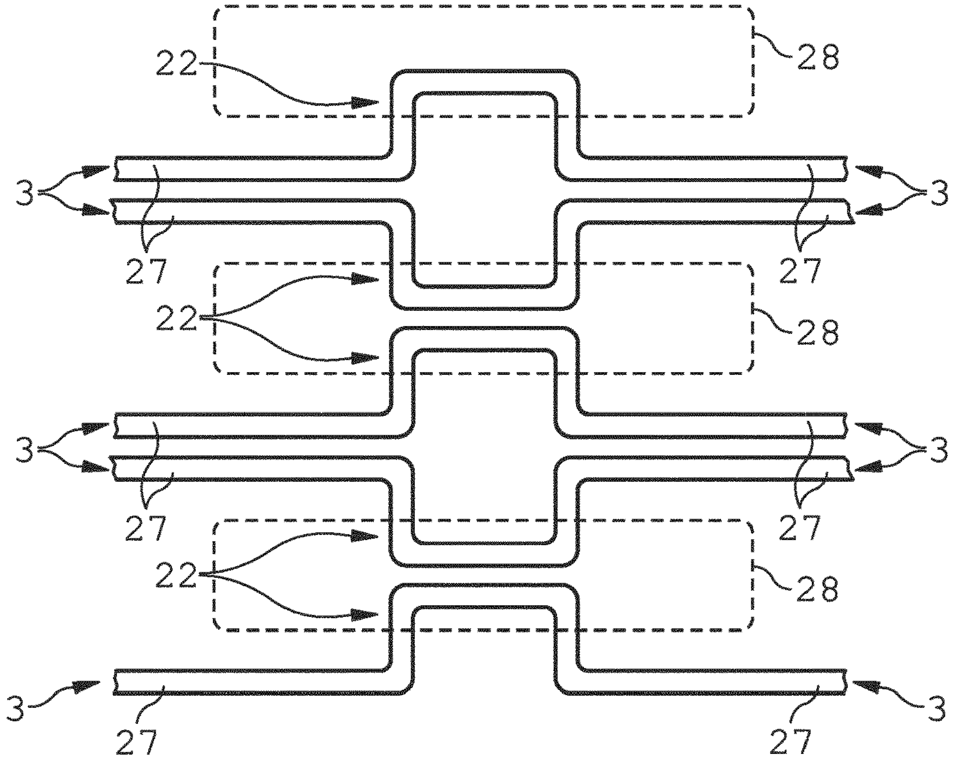
FIG. 9 illustrates a schematic view for an arrangement of several transmission lines similar to the transmission line shown in FIG. 8.

FIG. 9 illustrates the arrangement of several transmission lines 3 that run parallel with respect to each other on a top surface 14 of a substrate layer 4 that is not shown in FIG. 9. The transmission sections 27 of the transmission lines 3 run into the transition sections 22. For each transmission line 3 comprising two transmission sections 27 that run into the corresponding transition sections 22 each of the two transition sections 22 is superposed by a cross-section 28 of a different, i.e. adjacent end section 20 of the corresponding output waveguide 19. Thus, a radio frequency signal that is transmitted through the adjacent output waveguides 19 couples into the corresponding transition sections 22 that are superposed by the respective end sections 20 of the waveguides 19. The waveguide system 2 can be designed in a manner that the two adjacent outgoing radio frequency signals that are emitted by adjacent output waveguides 19 have a phase difference of 180 degrees. Then, the output radio frequency signals that are coupled into the two transition sections 22 of a single transmission line 3 with two adjacent transmission sections 27 match with a phase difference of 180 degrees, resulting in a differential mode radio frequency signal transmission along the transmission lines 3.

Figure 10:
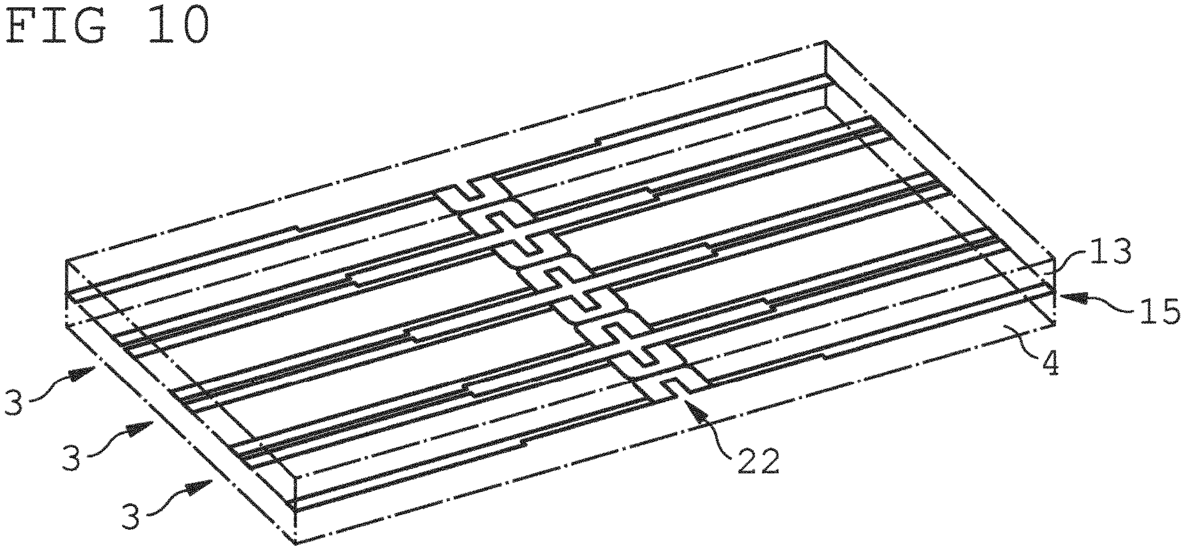
FIG. 10 illustrates a perspective view of a substrate layer arrangement with a number of transmission lines arranged between a first substrate layer and a second substrate layer.

FIG. 10 illustrates a perspective view of the substrate layer arrangement 15 with a number of transmission lines 3 arranged between the first substrate layer 4 and the second substrate layer 13. The shape of the transmission lines 3 with the transmission sections 27 that run into the transition sections 22 is similar to the shape of the transmission sections shown in FIGS. 8 and 9.

Figure 11:
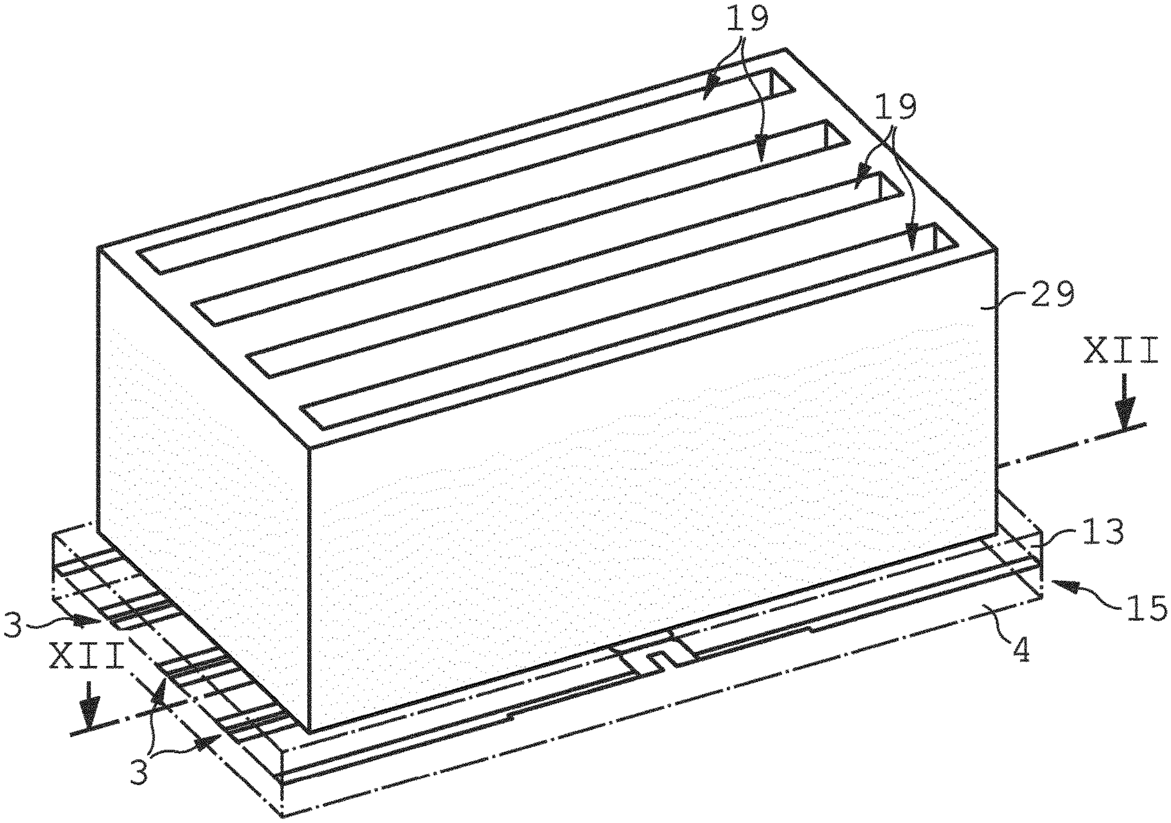
FIG. 11 illustrates a perspective view of the arrangement of transmission lines shown in FIG. 10 and a corresponding number of end sections of output waveguides, whereby the several end sections are formed within a monolithic structure of an electroconductive material.

In FIG. 11 a monolithic structure 29 is arranged on top of the substrate layer arrangement 15 including the arrangement of transmissions lines 3 between the first substrate layer 4 and the second substrate layer 13. of the arrangement of transmission lines shown in FIG. 10 and a corresponding number of end sections of output waveguides, whereby the several end sections 20 are formed within a monolithic structure 29 of an electroconductive material. The end sections 20 of the output waveguides 19 that are formed within the monolithic structure 29 superpose the transition sections 22 of the transmission lines 3, whereby the arrangement of the end sections 20 of the output waveguides 19 within the monolithic structure 29 and the arrangement of the corresponding transmission lines 3 with the transition sections 22 that are superposed by the end sections 20 of the output waveguides 19 is similar to the arrangement shown in FIG. 9.

Figure 12:
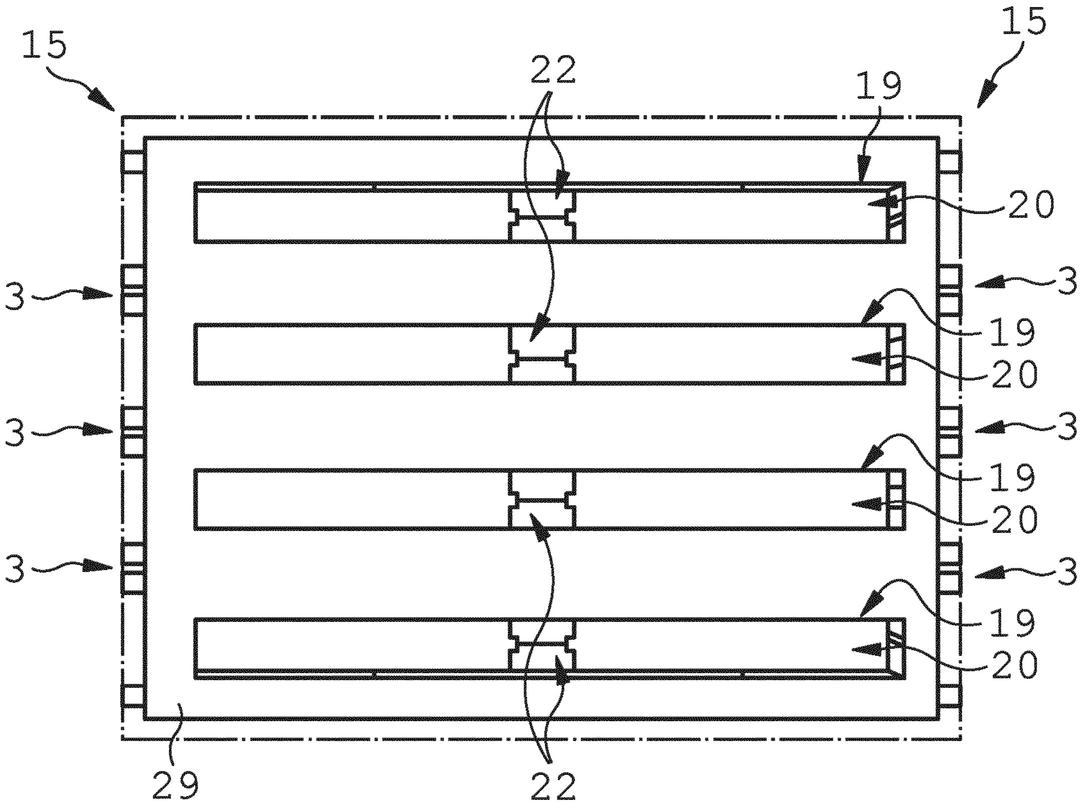
FIG. 12 illustrates a sectional view through the end sections within the monolithic structure shown in FIG. 11 along the line XII-XII in FIG. 11.

FIG. 12 illustrates a sectional view through the end sections 20 within the monolithic structure 29 shown in FIG. 11 along the line XII-XII in FIG. 11. The outgoing radio frequency signals that are transmitted through the end sections 20 of adjacent output waveguides 19 are transitioned into the transition sections 22 that are visible within the cross-sections 28 of the end sections 20 of the adjacent output waveguides 19.

The invention claimed is:

1. A radio frequency device with a transition unit (1) providing a radio frequency signal transition between a radio frequency hollow waveguide system (2) and a planar transmission line (3), the radio frequency device comprising a substrate layer arrangement (15) with the planar transmission line (3) arranged on a first surface (14) of a first substrate layer (4) of the substrate layer arrangement (15), wherein the transition unit (1) comprises a transition section (22) of the transmission line (3) that is configured as a radio frequency signal transition pattern, and wherein the transition unit (1) further comprises an end section (11, 20) of the waveguide system (2) for radio frequency electromagnetic waves that is attached to the substrate layer arrangement (15) and that superposes the radio frequency signal transition pattern, wherein the transition unit (1) comprises two or more transition sections (22) of a corresponding number of transmission lines (3) that are arranged adjacent to each other, wherein the hollow waveguide system (2) comprises a distribution section wherein one input waveguide (5, 8) is separated into one dedicated output waveguide (10, 19) for each of the transition sections (22), wherein for each of the transition sections (22) of the transmission lines (3) a corresponding end section (11, 20) of a respective output waveguide (10, 19) is directed perpendicular to the first surface (14) of the first substrate layer (4) of the substrate layer arrangement (15), wherein for each end section (11, 20) an open end of the end section (11, 20) of the waveguide system (2) superposes the corresponding transition section (22), and wherein the two or more end sections (11, 20) of the waveguide system (2) are arranged adjacent to each other in order to provide for favorable boundary conditions for electromagnetic wave propagation that result in reduced radio frequency signal power leakage from the transition unit (1) when compared to a transition unit with only one end section (11, 20) of the waveguide system (2);

several or all end sections (11, 20) of the output waveguides (10, 19) that are attached to the substrate layer arrangement (15) are arranged along a straight line; and the transition unit (1) comprises for each end of a row (21) one waveguide section element (25) arranged adjacent to the last output waveguide (19) within the row (21).

2. The radio frequency device according to claim 1, wherein the waveguide section element (25) is identical to the end section (20) of the last output waveguide (19) within the row (21).

3. A radio frequency device with a transition unit (1) providing a radio frequency signal transition between a radio frequency hollow waveguide system (2) and a planar transmission line (3), the radio frequency device comprising a substrate layer arrangement (15) with the planar transmission line (3) arranged on a first surface (14) of a first substrate layer (4) of the substrate layer arrangement (15), wherein the transition unit (1) comprises a transition section (22) of the transmission line (3) that is configured as a radio frequency signal transition pattern, and wherein the transition unit (1) further comprises an end section (11, 20) of the waveguide system (2) for radio frequency electromagnetic waves that is attached to the substrate layer arrangement (15) and that superposes the radio frequency signal transition pattern, wherein the transition unit (1) comprises two or more transition sections (22) of a corresponding number of transmission lines (3) that are arranged adjacent to each other, wherein the hollow waveguide system (2) comprises a distribution section wherein one input waveguide (5, 8) is separated into one dedicated output waveguide (10, 19) for each of the transition sections (22), wherein for each of the transition sections (22) of the transmission lines (3) a corresponding end section (11, 20) of a respective output waveguide (10, 19) is directed perpendicular to the first surface (14) of the first substrate layer (4) of the substrate layer arrangement (15), wherein for each end section (11, 20) an open end of the end section (11, 20) of the waveguide system (2) superposes the corresponding transition section (22), and wherein the two or more end sections (11, 20) of the waveguide system (2) are arranged adjacent to each other in order to provide for favorable boundary conditions for electromagnetic wave propagation that result in reduced radio frequency signal power leakage from the transition unit (1) when compared to a transition unit with only one end section (11, 20) of the waveguide system (2);

wherein the transition unit (1) comprises at least one or more back cavities (24), wherein each back cavity (24) is arranged opposite to a corresponding end section (20) of an output waveguide (19) that is attached to the substrate layer arrangement (15) with an open end of the back cavity (24) directed towards the first substrate layer (4), wherein the back cavity (24) prevents a part of a radio frequency signal emission that is emitted from the emission pattern from leaking outside of the end section (20) of the output waveguide (19).

4. The radio frequency device according to claim 1, wherein the hollow waveguide system (2) comprises N output waveguides (10, 19) and N−1 corresponding waveguide splitting units (6, 9, 18) that each split-up one input waveguide (5, 8, 17) into two output waveguides (7, 10, 19), with N being an even integer number.

5. The radio frequency device according to claim 1, wherein the hollow waveguide system (2) comprises 2N output waveguides (7, 10, 19), with N being an integer number and with N>1.

6. The radio frequency device according to claim 1, wherein the end sections (11, 20) of the output waveguides (10, 19) that are attached to the substrate layer arrangement (15) are symmetric in shape.

7. The radio frequency device according to claim 1, wherein the end sections (11, 20) of the output waveguides (10, 19) that are attached to the substrate layer arrangement (15) are of rectangular shape.

8. The radio frequency device according to claim 1, wherein the end sections (11, 20) of the output waveguides (10, 19) that are attached to the substrate layer arrangement (15) are arranged in two or more rows (21) running parallel and at a distance towards each other.

9. A radio frequency device with a transition unit (1) providing a radio frequency signal transition between a radio frequency hollow waveguide system (2) and a planar transmission line (3), the radio frequency device comprising a substrate layer arrangement (15) with the planar transmission line (3) arranged on a first surface (14) of a first substrate layer (4) of the substrate layer arrangement (15), wherein the transition unit (1) comprises a transition section (22) of the transmission line (3) that is configured as a radio frequency signal transition pattern, and wherein the transition unit (1) further comprises an end section (11, 20) of the waveguide system (2) for radio frequency electromagnetic waves that is attached to the substrate layer arrangement (15) and that superposes the radio frequency signal transition pattern, wherein the transition unit (1) comprises two or more transition sections (22) of a corresponding number of transmission lines (3) that are arranged adjacent to each other, wherein the hollow waveguide system (2) comprises a distribution section wherein one input waveguide (5, 8) is separated into one dedicated output waveguide (10, 19) for each of the transition sections (22), wherein for each of the transition sections (22) of the transmission lines (3) a corresponding end section (11, 20) of a respective output waveguide (10, 19) is directed perpendicular to the first surface (14) of the first substrate layer (4) of the substrate layer arrangement (15), wherein for each end section (11, 20) an open end of the end section (11, 20) of the waveguide system (2) superposes the corresponding transition section (22), and wherein the two or more end sections (11, 20) of the waveguide system (2) are arranged adjacent to each other in order to provide for favorable boundary conditions for electromagnetic wave propagation that result in reduced radio frequency signal power leakage from the transition unit (1) when compared to a transition unit with only one end section (11, 20) of the waveguide system (2);

wherein at least two adjacent transmission lines (3) each comprise a transmission section (27) that runs into the transition section (22), wherein the transition section (22) is superposed by the end section (11, 20) of the corresponding output waveguide (10, 19) and wherein the transmission section (27) is arranged outside of a surface area on the first surface (14) of the first substrate layer (4) that is superposed by this end section (11, 20) of the corresponding output waveguide (10, 19).

10. The radio frequency device according to claim 3, wherein the hollow waveguide system (2) comprises N output waveguides (10, 19) and N−1 corresponding waveguide splitting units (6, 9, 18) that each split-up one input waveguide (5, 8, 17) into two output waveguides (7, 10, 19), with N being an even integer number.

11. The radio frequency device according to claim 3, wherein the hollow waveguide system (2) comprises 2N output waveguides (7, 10, 19), with N being an integer number and with N>1.

12. The radio frequency device according to claim 3, wherein the end sections (11, 20) of the output waveguides (10, 19) that are attached to the substrate layer arrangement (15) are symmetric in shape.

13. The radio frequency device according to claim 3, wherein the end sections (11, 20) of the output waveguides (10, 19) that are attached to the substrate layer arrangement (15) are of rectangular shape.

14. The radio frequency device according to claim 3, wherein the end sections (11, 20) of the output waveguides (10, 19) that are attached to the substrate layer arrangement (15) are arranged in two or more rows (21) running parallel and at a distance towards each other.

15. The radio frequency device according to claim 9, wherein the hollow waveguide system (2) comprises N output waveguides (10, 19) and N−1 corresponding waveguide splitting units (6, 9, 18) that each split-up one input waveguide (5, 8, 17) into two output waveguides (7, 10, 19), with N being an even integer number.

16. The radio frequency device according to claim 9, wherein the hollow waveguide system (2) comprises 2N output waveguides (7, 10, 19), with N being an integer number and with N>1.

17. The radio frequency device according to claim 9, wherein the end sections (11, 20) of the output waveguides (10, 19) that are attached to the substrate layer arrangement (15) are symmetric in shape.

18. The radio frequency device according to claim 9, wherein the end sections (11, 20) of the output waveguides (10, 19) that are attached to the substrate layer arrangement (15) are of rectangular shape.

19. The radio frequency device according to claim 9, wherein the end sections (11, 20) of the output waveguides (10, 19) that are attached to the substrate layer arrangement (15) are arranged in two or more rows (21) running parallel and at a distance towards each other.

* * * * *